E. R. HOLDEN.
ORE SEPARATOR.
APPLICATION FILED MAY 14, 1913. RENEWED SEPT. 24, 1915.
1,181,666.
Patented May 2, 1916.
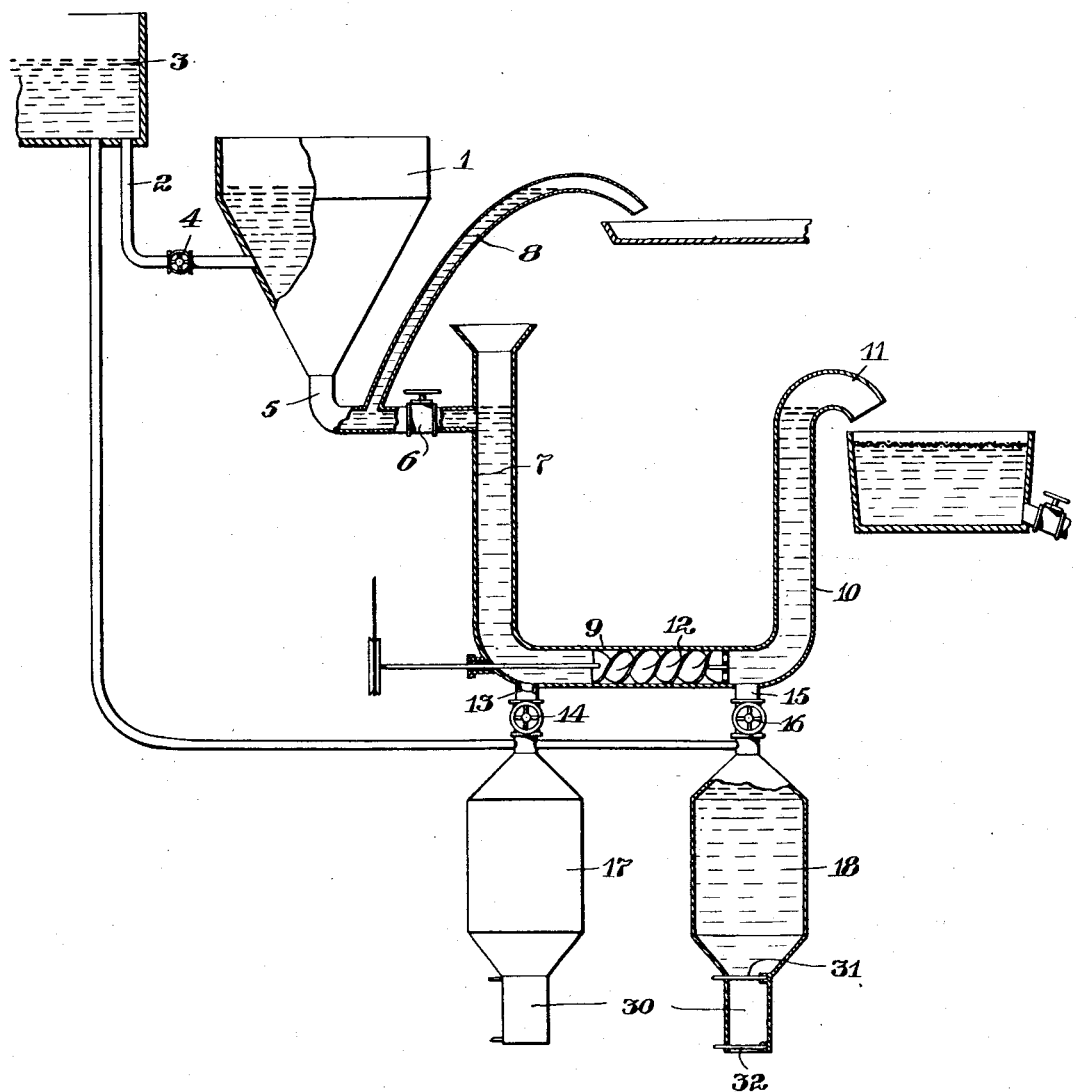

UNITED STATES PATENT OFFICE.

EDWARD R. HOLDEN, OF NEW YORK, N. Y.

ORE-SEPARATOR.

1,181,666.  Specification of Letters Patent.  Patented May 2, 1916.

Application filed May 14, 1913, Serial No. 767,521. Renewed September 24, 1915. Serial No. 52,527.

*To all whom it may concern:*

Be it known that I, EDWARD R. HOLDEN, a citizen of the United States, and a resident of the city of New York, borough of Manhattan, in the county of New York and State of New York, have invented certain new and useful Improvements in Ore-Separators, of which the following is a specification.
This invention relates to certain new and useful improvements in apparatus for separating ores, and the object of my invention is to provide such a machine or apparatus, for separating ores as they occur in nature and divide them into three sub-divisions, namely: A, the gangue; B, the compounds of metals as a whole, and each from the other; C, the metals; which apparatus is simple in construction, and is thorough and reliable in operation and prevents all loss of any valuable constituents of the ore under treatment.

In the accompanying drawings, I have shown diagrammatically in side view, partly in vertical section, one embodiment of my new and improved ore separator.

In bringing about the separation, I crush all the ore to whatever screen mesh is necessary, in order to free the metal and compound of metal contents from the gangue in the ore, which crushed ore passes from the crushing medium into the hopper 1, into which water is conducted through a pipe 2, from a tank or other water supply 3, the pipe 2 having a control cock 4. The water and ore pass from the hopper, through a pipe 5, provided with a control cock 6, into a preferably vertical conduit 7. A constant water level is maintained in the hopper 1, by an outside overflow pipe 8, connected with the hopper discharge pipe 5, at a point in advance of the control cock 6, as shown. The lower end of the conduit 7 is connected with a preferably horizontal conduit 9, which at the opposite end, is connected with a preferably vertical standpipe 10, terminating at its upper end in a downwardly extending spout 11. To facilitate the passage of the crushed ore, through the conduit 9, and to prevent the ore from accumulating therein, a power driven conveyer 12 of any suitable construction is preferably provided in the conduit 9. Directly under or a short distance from the lower end of the conduit
7, a water supply pipe 13, provided with a regulating valve 14, extends into the bottom of conduit 9, and another similar water supply pipe 15, provided with a regulating valve 16, extends into the bottom of conduit 9, at or directly under the standpipe 10. The pipes 13 and 15 lead to closed collecting chambers 17 and 18 containing dead water. The number of water supply pipes similar to 13 and 15 is immaterial, and one or more may be led into the bottom of the conduit 9, at any point under or between the conduits 7 and 10.

The operation is substantially as follows: The metals, compounds of metals and silicious matters, contained in the crushed ore, vary greatly in absolute weight, one as against the other in water, volume for volume, so that when the particles of silicious matter, metal and compounds of metal, are conducted downwardly under pressure through the conduit 7 to the conduit 9, each particle is individually acted upon by the upwardly directed water current pressure from the pipe 13, which upward current pressure is so minutely regulated as to prevent the largest particle of silicious matter in the ore, from dropping downward into the uprising current of water, and therefore, since, for instance, the sulfid of zinc or other compounds of zinc, volume for volume, have an absolute weight in water 4.28 times (average) as much as has silica. Pyrites or other compounds of iron, volume for volume, have an absolute weight in water 8.12 times (average) as much as has silica. Stephanite or other compounds of silver, volume for volume, have an absolute weight in water 14.4 times (average) as much as has silica. Galena, or other compounds of lead, volume for volume, have an absolute weight in water 23 times (average) as much as has silica; and in like manner with the other metals and compounds of metals, it necessarily follows, that all of the metals and compounds of metals in the crushed ore, whose absolute weight in water, is heavier than the largest particle of silica, will pass downwardly in the uprising stream and into the collecting chamber 17. Similar action occurs in the upright pipe 15, and the rising current of water, passing upwardly through the standpipe 10 and out through the spout 11, carries off all of the silica and all of the metals and compounds of metals, whose smaller volume, *ipso facto*, lesser weight, was insufficient to enable them to sink and pass downwardly through the water currents in the upright pipes 13 and 15, and on account of the difference of the absolute weights in water, of the various component parts of the crushed ore, it will be found that the product from the spout 11 will contain:

1. All of the silica.
2. All of the sulfid of zinc or other compounds of zinc, whose volume is less than 10/65ths of the volume of the largest particle of silica; all of the sulfid of iron or other compounds of iron, whose volume is less than 5/78ths of the volume of the largest particle of silica; all of the sulfid of silver or other compounds of silver, whose volume is less than 10/343rds of the volume of the largest particle of silica; all of the sulfid of lead or other compounds of lead, whose volume is less than 1/64th of the volume of the largest particle of silica; and so on with all the metals and compounds of metals.

This product is then passed through a screen, of a size, that will permit the sulfid of zinc or other compounds of zinc and the other metals and compounds of metals, to pass through it, on account of their smaller volume, retaining on its surface to be thrown away, all of the silica of a greater volume than the volume of the largest particle of the sulfid of zinc or other compounds of zinc, contained in the product, that was discharged at spout 11. After the screening process, the residual ore is then in the same condition as it was originally, so far as the absolute weight and volume relation of the component parts are concerned, since all of the coarser particles of silica have been thrown away and wasted, and all of the coarser metallic particles and of the compounds of metals, have been gathered in the collecting chambers 17 and 18. The screened residual ore is then again passed through the same conduit system, where the downward water current pressure in conduit 7, and the upward water current pressures in the pipes 13 and 15 have been readjusted to act in like manner, having taken into consideration the lesser absolute weights and volumes of the component parts in the residual ores to be treated. The process is then repeated as often as is necessary to remove all of the silicious matters, and leaves remaining the metals and various compounds of metals. The metals and compounds of metals, as collected in chambers 17 and 18 are now separated, each from the other, by passing them through the conduit system in the same manner, and adjusting the downward water current pressure in the conduit 7 and the upward water current pressures in the pipes 13 and 15, so as to prevent the largest particle of the sulfid of zinc or other compounds of zinc in the residual ore from dropping downwardly into the uprising currents of water, and therefore, since, for instance, pyrites or other compounds of iron, volume for volume, have an absolute weight in water 1.96 times (average) as much as has the sulfid of zinc or other compounds of zinc; stephanite or other compounds of silver, volume for volume, have an absolute weight in water 3.36 times (average) as much as has the sulfid of zinc or other compounds of zinc; galena or other compounds of lead, volume for volume, have an absolute weight in water 5.42 times (average) as much as has the sulfid of zinc or other compounds of zinc; and in like manner with the other metals and compounds of metals; it necessarily follows, that the metals and compounds of metals in the residual ore, whose absolute weight in water is heavier than the largest particle of the sulfid of zinc or other compounds of zinc, will pass downwardly into the uprising currents and into the collecting chambers 17 and 18. The rising current of water passing upwardly through the standpipe 10 and out through the spout 11, carries off all of the sulfid of zinc or other compounds of zinc, and all of the metals and compounds of metals, whose smaller volume, *ipso facto*, lesser weight, was insufficient to enable them to sink and pass downwardly through the water currents in the upright pipes 13 and 15, and on account of the difference of the absolute weights in water, of the various component parts of the residual ore, it will be found that the product from the spout 11 will now contain:

1. All of the sulfid of zinc or other compounds of zinc.
2. All of the sulfid of iron or other compounds of iron, whose volume is less than 10/13ths of the volume of the largest particle of the sulfid of zinc or other compounds of zinc; all of the sulfid of silver or other compounds of silver, whose volume is less than 10/17ths of the volume of the largest particle of the sulfid of zinc or other compounds of zinc; all of the sulfid of lead or other compounds of lead, whose volume is less than 10/21sts of the volume of the largest particle of the sulfid of zinc or other compounds of zinc; and so on with all the remaining metals and compounds of metals.

This product is then passed through a screen, of a size that will permit the sulfid of iron or other compounds of iron, and the other metals and compounds of metals to pass through it, on account of their smaller volume, retaining on its surface all the sulfid of zinc or other compounds of zinc, of a greater volume than the volume of the largest particle of the sulfid of iron or other compounds of iron. The zinc thus saved is the second lightest component part of the original ore and the first desired compound of a metal to be segregated and that was discharged at spout 11. After the screening process, the residual ore is then in the same condition as it was originally, so far as the absolute weight and volume relation of the component parts are concerned, since all the coarser particles of the sulfid of zinc or other compounds of zinc have been separated and saved by themselves, and all the coarser particles of the remaining compounds of metals and metallic particles have been gathered in the collecting chambers 17 and 18. This product, from the screen, is then passed through the conduit system and screen operations as many times as are necessary, in order to completely and finally segregate the sulfid of zinc and other compounds of zinc. The metals and compounds of metals, as collected in the collection chambers 17 and 18, during the process of segregating the sulfid of zinc and other compounds of zinc, are in like manner separated, each from the other, by passing them successively through the conduits and screens, as above described, for the separation of sulfid of zinc or other compounds of zinc from the remainder of the compounds of metals, and metals, by the necessary adjustments of the downward water current pressure in conduit 7 and the upward rising currents in the pipes 13 and 15 and the necessary screening operations.

In all cases, the separation of the ore into its component parts takes place wholly in water, and in conduits from which all air has been excluded, thereby eliminating all surfaces, and *ipso facto* float metals or compounds of metals, and in running, moving or active water under pressure, whereas the separated material is collected in dead water, and from the screen surfaces.

It is obvious, of course, that, instead of repassing the ore through the same conduit system a number of times, to effect complete separation, that a series of conduit systems, each connected with the other in any suitable manner, may be used, provided that the downward water current pressure in conduit 7 and the uprising currents in the pipes 13 and 15 are adjusted, in each conduit to handle, in the manner hereinbefore set forth, the material passing through it, and the proper size screens are used between the various conduit systems.

By means of the discharge necks 30 and the valves 31 and 32, or similar device, the contents of the collection receptacles 17 and 18 can be discharged from time to time, without stopping the operation of the apparatus.

Having described my invention, what I claim as new and desir to secure by Letters Patent is:—

1. In an ore concentrator, the combination with a U-shaped conduit provided with a horizontal bottom portion, with an inlet standard at one end and with an outlet standard at the other end, of means for admitting water under greater or less pressure into the inlet standard to maintain a level of water in the entire conduit, a conveyer screw mounted in the horizontal member of the U-shaped conduit and a closed collecting vessel containing dead water connected with said conduit at the bottom of the vertical outlet member and means for admitting water of a pressure greater than that in the conduit, into the bottom of the conduit, substantially as set forth.

2. In an ore concentrator, the combination with a U-shaped conduit provided with a horizontal bottom portion, with an inlet standard at one end and with an outlet standard at the other end, of means for admitting water under greater or less pressure into the inlet standard to maintain a level of water in the entire conduit, a conveyer screw mounted in the horizontal member of the U-shaped conduit and a closed collecting vessel containing dead water connected with said conduit at the bottom of the vertical outlet member and means for admitting water under a pressure greater than that existing in the conduit into the bottom of the conduit at opposite ends of the conveyer screw, substantially as set forth.

Signed at New York city, in the county of New York and State of New York, this 9th day of May, A. D. 1913.

EDWARD R. HOLDEN.

Witnesses:
  OSCAR F. GUNZ,
  THEO. S. J. STERITER.